(12) United States Patent
Dean

(10) Patent No.: US 9,162,569 B2
(45) Date of Patent: Oct. 20, 2015

(54) METHOD OF CONTROLLING A DIFFERENTIAL LOCK

(71) Applicant: ArvinMeritor Technology, LLC, Troy, MI (US)

(72) Inventor: Simon Dean, West Bloomfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 94 days.

(21) Appl. No.: 13/953,792

(22) Filed: Jul. 30, 2013

(65) Prior Publication Data

US 2015/0039201 A1  Feb. 5, 2015

(51) Int. Cl.
  *B60T 7/12* (2006.01)
  *B60K 23/04* (2006.01)
  *B60K 28/16* (2006.01)
  *B60K 17/36* (2006.01)

(52) U.S. Cl.
  CPC .............. *B60K 23/04* (2013.01); *B60K 28/165* (2013.01); *B60K 17/36* (2013.01); *B60K 2023/046* (2013.01); *B60W 2550/142* (2013.01); *B60W 2550/402* (2013.01)

(58) Field of Classification Search
  USPC .......................................................... 701/88
  See application file for complete search history.

(56) References Cited

U.S. PATENT DOCUMENTS

| 4,768,399 A * | 9/1988 | Kubo et al. ................ 475/223 |
| 6,361,466 B1 | 3/2002 | Kyrtsos |
| 2006/0124374 A1* | 6/2006 | Katada et al. ............. 180/233 |
| 2009/0221392 A1* | 9/2009 | Bruce ......................... 475/205 |
| 2010/0131122 A1 | 5/2010 | Dersjo et al. |
| 2010/0301825 A1* | 12/2010 | Yamaguchi et al. ......... 323/284 |
| 2012/0111691 A1* | 5/2012 | Leiter et al. ................ 192/221 |
| 2013/0245909 A1* | 9/2013 | Hirose et al. .................. 701/73 |
| 2014/0213412 A1* | 7/2014 | Marsh et al. ................ 477/35 |

FOREIGN PATENT DOCUMENTS

| EP | 2489539 A1 | 8/2012 |
| EP | 2589521 A2 | 5/2013 |
| WO | 2012161648 A1 | 11/2012 |

OTHER PUBLICATIONS

European Patent Office, Search Report for the corresponding European Patent Application No. 14178610.3 dated Dec. 15, 2014.

* cited by examiner

*Primary Examiner* — Hussein A. Elchanti
(74) *Attorney, Agent, or Firm* — Brooks Kushman P.C.

(57) ABSTRACT

A method of controlling a differential lock. The method may include determining a target point for disengaging the differential lock and disengaging the differential lock when the vehicle reaches the target point.

12 Claims, 3 Drawing Sheets

METHOD OF CONTROLLING A DIFFERENTIAL LOCK

TECHNICAL FIELD

This patent application relates to a method of controlling a differential lock of a driveline of a vehicle.

BACKGROUND

A differential lock control is disclosed in U.S. Pat. No. 6,361,466.

SUMMARY

In at least one embodiment, a method of controlling a differential lock of a driveline of a vehicle is provided. The method may include determining a target point for disengaging the differential lock when the vehicle is travelling up an incline that exceeds a threshold incline value and disengaging the differential lock when the vehicle reaches the target point.

In at least one embodiment, a method of controlling a differential lock of a driveline of a vehicle is provided. The method may include determining a target point for disengaging the differential lock when the vehicle is approaching a road curve and a vehicle speed is exceeds a threshold speed value and disengaging the differential lock when the vehicle reaches the target point.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
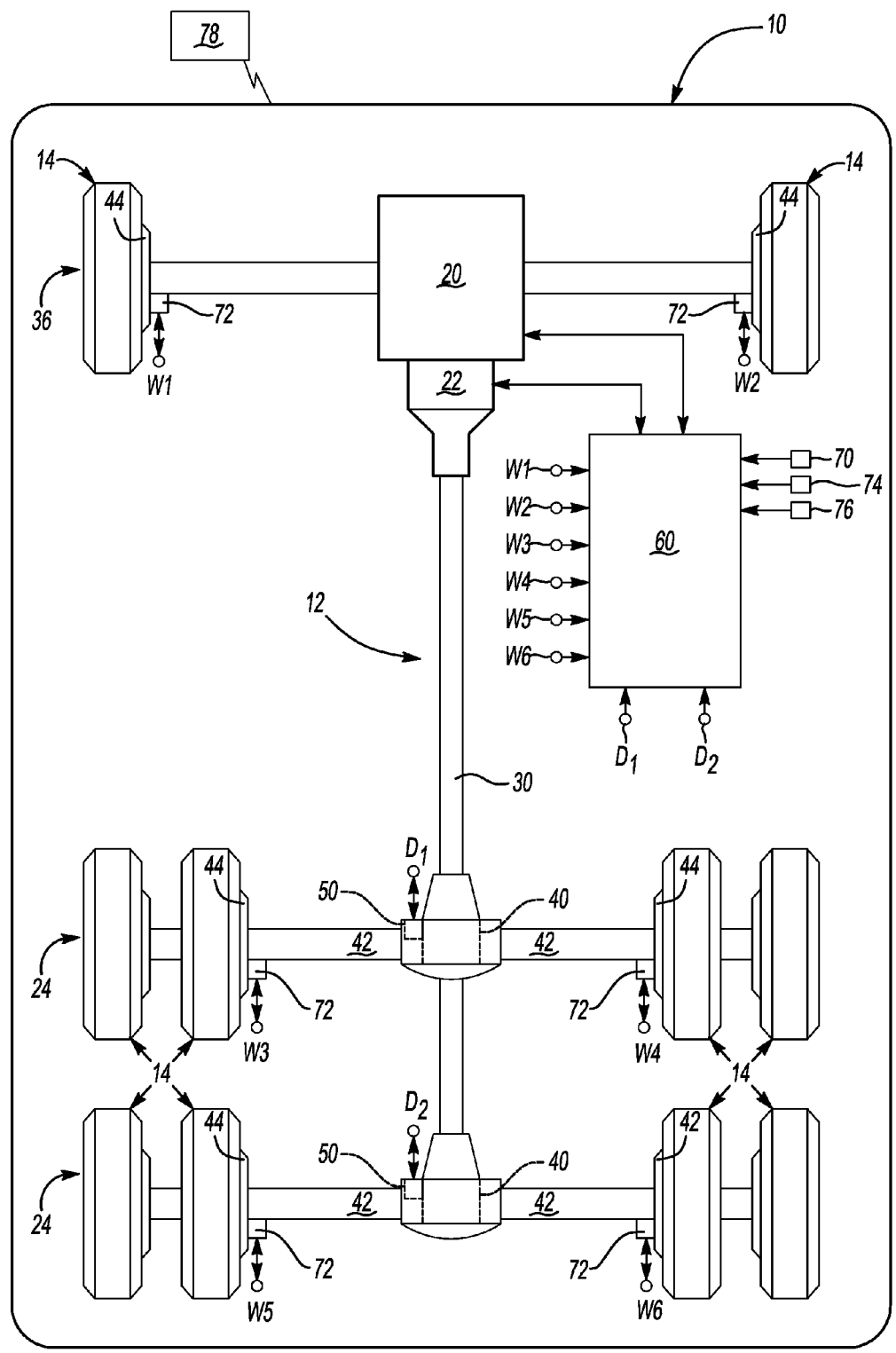
FIG. 1 is a schematic representation of a vehicle having a differential lock.

Referring to FIG. 1, an exemplary vehicle 10 is shown. The vehicle 10 may be a motor vehicle like a truck, farm equipment, or military transport or weaponry vehicle. The vehicle 10 may include a trailer for transporting cargo in one or more embodiments.

The vehicle 10 may have a drivetrain 12 that may provide torque to one or more wheel assemblies 14 to propel the vehicle 10. The drivetrain 12 may have a hybrid configuration that may employ multiple power sources or a non-hybrid configuration. In a non-hybrid configuration, the drivetrain 12 may include an engine 20, a transmission 22, and at least one drive axle assembly 24.

The engine 20 may provide power that may be used to rotate one or more wheel assemblies 14. For example, the vehicle 10 may have a set of wheel assemblies 14 that may include a tire mounted on a wheel. In at least one embodiment, the engine 20 may be configured as an internal combustion engine that may be adapted to combust any suitable type of fuel, such as gasoline, diesel fuel, or hydrogen.

The transmission 22 may be coupled to or may be driven by the engine 20. The transmission 22 may be of any suitable type, such as a multi-gear "step ratio" transmission as is known by those skilled in the art.

A drive axle assembly 24 may rotatably support one or more wheel assemblies 14. In FIG. 1, two drive axle assemblies 24 are shown in a tandem axle configuration, although it is contemplated that a greater or lesser number of drive axle assemblies 24 may be provided. In a tandem configuration, the drive axle assemblies 24 may be designated as a forward-rear drive axle assembly and a rear-rear drive axle assembly. An output of the transmission 22 may be coupled to an input of the forward-rear axle assembly 24 with a drive shaft 30. An output of the forward-rear drive axle assembly 24 may be selectively coupled to an input of the rear-rear drive axle assembly 24, if provided, via a prop shaft 32.

The vehicle 10 may also include a front axle assembly 36 that may be configured to steer the vehicle 10. The front axle assembly 36 may or may not be configured as a drive axle that provides torque to at least one associated wheel assembly 14.

One or more drive axle assemblies 24 may each have a differential 40. The differential 40 may receive torque from the engine 20 and transmission 22 and may transmit torque to a wheel assembly 14 via an associated axle 42. Each axle 42 may interconnect the differential 40 to at least one associated wheel hub assembly 44. In FIG. 1, two axles 42 are provided that extend from opposite sides of the differential 40. Each axle 42 may be coupled to an output of the differential 40 at a first end and may be fixedly coupled to a corresponding wheel hub assembly 44 at a second end. The wheel hub assembly 44 may facilitate coupling of a wheel assembly 14 to an axle 42. For example, a wheel assembly 14 may be mounted on and may rotate with the wheel hub assembly 44.

The differential 40 may include a differential lock 50 that may be configured to inhibit different axles 42 from rotating at different speeds or permit different axles 42 of the axle assembly 24 to rotate at different speeds. The differential lock 50 may have any suitable configuration and may include an actuator that may actuate the differential lock 50 between an engaged or locked position and a disengaged or unlocked position. More specifically, the differential lock 50 may be engaged or move to an engaged position to transmit torque to both axles 42 such that both axles 42 and their associated wheel assemblies 14 rotate together at a common speed. Such locking of the differential 40 may help increase traction. The differential lock 50 may be disengaged or move to a disengaged position in which torque may be transmitted to the axles 42 but the axles 42 and their associated wheel assemblies 14 are permitted to rotate at different speeds. Such unlocking of the differential 40 may aid in negotiating a turn and help avoid undesirable vehicle handling or tire wear.

One or more controllers or control modules 60 may be provided to monitor and control various components and systems of the vehicle 10. For example, the control module 60 may be electrically connected to or communicate with components of the drivetrain 12, such as the engine 20, transmission 22, and axle assemblies 24 to monitor and control their operation and performance. The control module 60 may also monitor and control the differential lock 50 as will be discussed in more detail below. Communication between the control module 60 and each axle assembly 24 and differential lock 50 is represented by connection nodes D1 and D2 in FIG. 1. In addition, the control module 60 may also process input signals or data from various input devices or sensors. Input devices that may be provided with the vehicle 10 may include an antenna 70, one or more speed sensors 72, an inclinometer 74, and an operator communication device 76.

The antenna 70 may be used to wirelessly receive data from a data source 78 external to the vehicle 10. For instance, the antenna 70 may be used to receive data from a data source like a global positioning system (GPS) that may be indicative of vehicle speed and/or vehicle location. In addition, the antenna 70 may be used to receive road attribute data. Road attribute data may include information pertaining to a road upon which the vehicle 10 is travelling, such as terrain data (e.g., topography or elevation data that may be indicative of the location and/or magnitude or grade of a hill or incline, location of a crest or peak of a hill or incline, etc.) and/or road path data (e.g., the data that may be indicative of the location of a road curve, magnitude or radius of curvature of the road curve, amount of banking of the road curve, etc.). Such road attribute data may also be provided for roads upon which the vehicle 10 is not currently travelling but may travel upon during a trip, such as may be associated with a preprogrammed travel route. Moreover, it is contemplated that road attribute data may be provided with an onboard vehicle navigation system that may store or may be pre-programmed with road attribute data rather than receive it wirelessly. In addition, the antenna 70 may be used to receive data from a data source like another vehicle that may indicate upcoming road conditions or road attributes. Such data may be received from another vehicle located nearby the vehicle 10, such as another vehicle in a convoy or another vehicle that is ahead of the vehicle 10 and travelling at least a portion of the same travel route. For example, a first vehicle may wirelessly receive road attribute data from a second vehicle that may be travelling on the same road or route ahead of the first vehicle. As such, road attribute data may also be communicated from vehicle-to-vehicle or truck-to-truck.

The speed sensor 72 may be provided to detect or provide data indicative of the speed of the vehicle 10. The speed sensor 72 may be of any suitable type. For example, the speed sensor 72 may be configured as a wheel speed sensor that detects the rotation speed of a wheel assembly 14 or associated wheel axle 42. Data from the speed sensor 72 may also be used to determine a distance of travel of the vehicle 10. For instance, distance of travel may be based on tire size (e.g., tire diameter) and the rotational distance or number of revolutions detected by the speed sensor 72. In at least one embodiment, a speed sensor 72 may be associated with each wheel assembly 14 or wheel axle 42, such as may be provided with an anti-lock brake system or traction control system. As such, the speed sensor 72 may detect wheel slip or unexpected rotation of a wheel assembly 14 in a manner known by those skilled in the art. Communication between the control module 60 and each speed sensor 72 is represented by connection nodes W1 through W6 in FIG. 1.

The inclinometer 74 may be provided for detecting, measuring, and/or determining an angle of slope or inclination of the vehicle 10. Such measurements may be indicative of a road grade or slope of a surface upon which the vehicle 10 is disposed. The inclinometer 74 may be an on-vehicle inclinometer, a virtual inclinometer, or combinations thereof. For example, a virtual inclinometer may include or may be based on data provided by a global positioning system or vehicle location data in combination with land terrain data. In at least one embodiment, the inclinometer 74 may provide data indicative of the number of degrees at which the vehicle 10 is inclined or declined with respect to an artificial horizon.

The operator communication device 76 may be provided to receive an input from an operator. The operator communication device 76 may be of any suitable type or types, such as a switch, button, sensor, display, touchscreen, voice command or speech recognition system, or the like. The operator communication device 76 may be used to input data that may not be predetermined or provided by a sensor or other input device, such as may be the case when a vehicle 10 is not equipped with one or more of the sensors discussed herein. In addition, the operator communication device 76 may be used to manually control the operation of the differential lock 50 or enable or disable execution of methods of controlling the differential lock 50 described herein.

Figure 3:
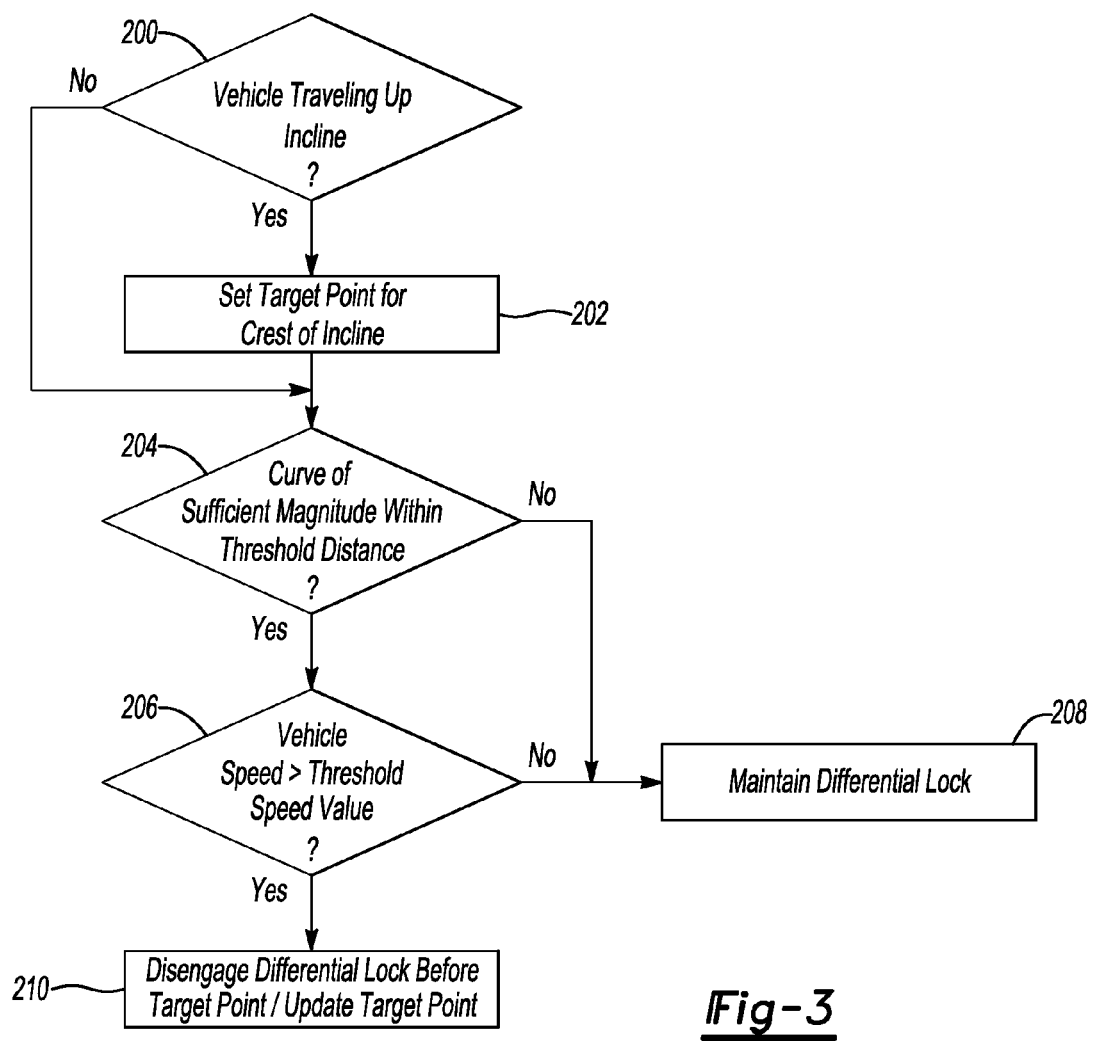
FIG. 3 expands upon the flowchart in FIG. 2.

Referring to FIG. 3, a flowchart of an exemplary method of controlling a differential lock 50 of a driveline 12 of a vehicle 10 is shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the spirit or scope of the present invention.

Figure 2:
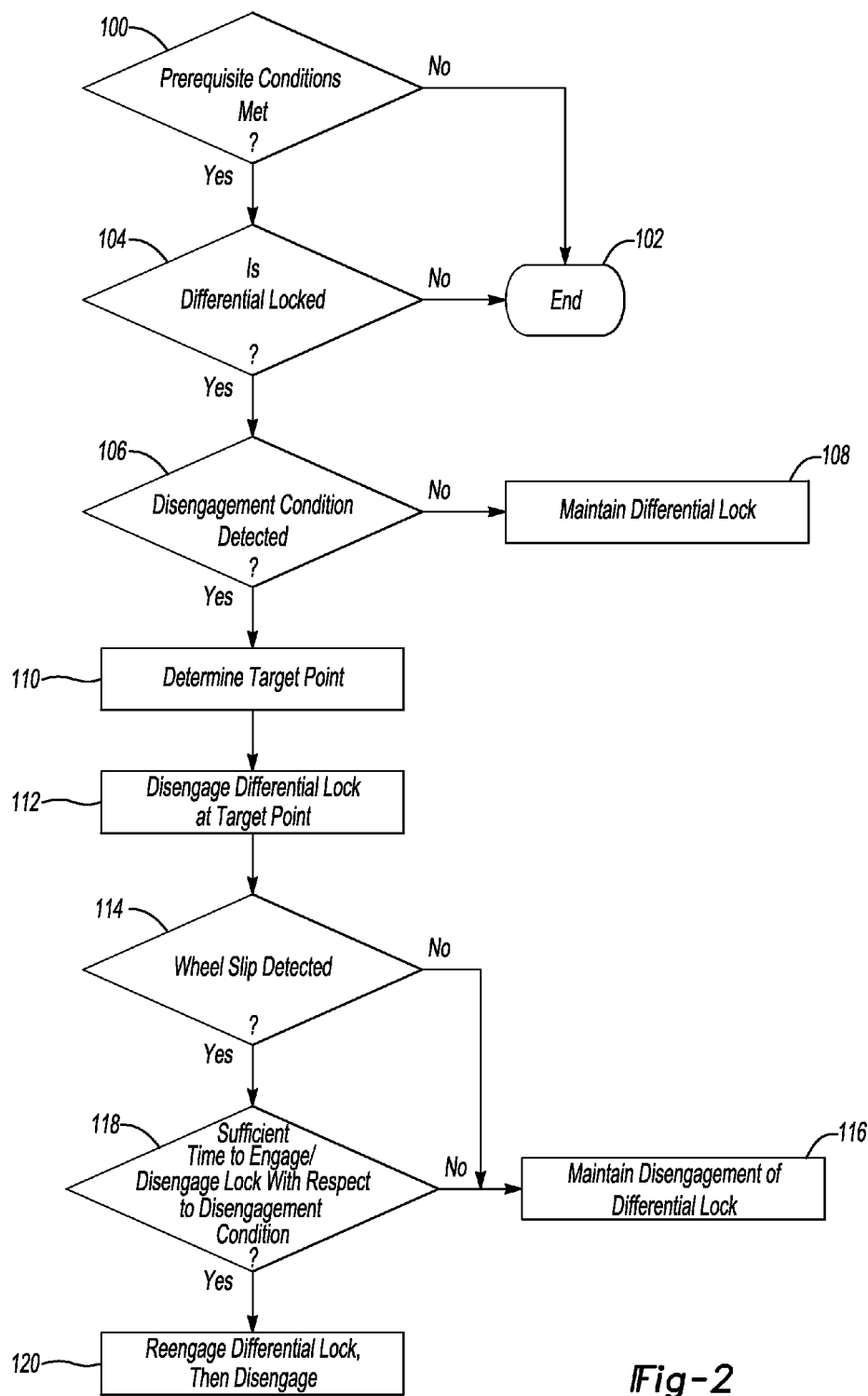
FIG. 2 is a flowchart of a method of controlling a differential lock.

The method may be executed by the control module 60 and may be implemented as a closed loop control system. As such, the flowcharts in FIGS. 2 and 3 may be representative of a single iteration and may be repeated to provide continuous monitoring and control.

At block 100, the method may determine whether one or more prerequisite method execution conditions have been met. For example, the method may not be executed when method execution is disabled by an operator. Method execution may be disabled by an operator using the operator communication device 76. In addition, the method may not be executed when the vehicle is traveling at a low speed. For instance, the method may not be executed when the vehicle speed is less than a prerequisite vehicle speed value. Vehicle speed data may be provided by the speed sensor 72 or based on the change in vehicle location over time. The prerequisite vehicle speed value may be indicative of a low rate of speed, such as when a vehicle is traveling through a parking lot or approaching a dock. In at least one embodiment, the prerequisite vehicle speed value may be around or less than 10 mph (16 km/h). If the prerequisite method execution condition or conditions have not been met, then the method or method iteration may end at block 102. If the prerequisite method execution condition or conditions have been met, then the method may continue at block 104.

At block 104, a determination may be made as to whether the differential is locked. Such a determination may be based on data indicative of the position of the differential lock 50, such as data indicative of the position of a differential lock actuator or one or more sensors that may directly or indirectly detect whether the differential lock 50 is engaged or disengaged. If the differential is not locked (i.e., the differential lock is disengaged), then the method or method iteration may end at block 102. If the differential is locked (i.e., the differential lock is engaged), then the method may continue at block 106.

At block 106, the method may determine whether a disengagement condition is detected. A disengagement condition may be detected or may exist when the vehicle is traveling up an incline and/or when the vehicle is expected to negotiate a curve having a sufficient magnitude. Exemplary disengagement conditions will be discussed in more detail below with reference to FIG. 3. If a disengagement condition is not detected, then the method may continue at block 108 where the differential lock is maintained in its current position, namely the engaged or locked position. If a disengagement condition is detected, then the method may continue at block 110.

At block 110, a target point for disengaging the differential lock may be determined. The target point may be set or established based on road attribute data, vehicle speed and/or vehicle location data. Data may be provided via the antenna 70 as previously discussed. Setting or determining a target point will also be discussed in more detail below with reference to FIG. 3. In summary, the target point may be set at the crest of an incline for when the vehicle is traveling up an incline having a sufficient magnitude and may be set at a position that is located prior to reaching a road curve when the vehicle is expected to negotiate a curve having sufficient magnitude.

At block 112, the differential lock may be actuated to the disengaged position when the vehicle reaches the target point. As such, the axles and vehicle wheels of an associated axle assembly may be permitted to rotate at different speeds.

At block 114, the method may determine whether wheel slip is detected. More specifically, wheel slip may be detected for an axle assembly having a differential 40 and a differential lock 50 that may be controlled by the control module 60 or by using the method. Wheel slip may be detected using an antilock brake system or traction control system as previously discussed. If wheel slip is not detected, then the method may continue at block 116, where the differential lock may be maintained in the disengaged or unlocked position. If wheel slip is detected, then the method may continue at block 118.

At block 118, the method may determine whether there is sufficient time to reengage and disengage the differential lock. For example, the differential lock may be engaged prior to the vehicle reaching a road curve. Reengagement of the differential lock may be desired when wheel slip is detected to help increase vehicle traction, provided that the differential lock can also be subsequently disengaged prior to reaching the road curve. As such, the differential lock may be reengaged to help address wheel slip conditions, but not when the vehicle reaches or is traveling along a road curve having a sufficient magnitude. The determination as to whether there is sufficient time to reengage and disengage the differential lock may be based on the location of the vehicle, the speed of the vehicle, and the distance from the current vehicle location to the road curve. Location information may be provided by a global positioning system or another vehicle or external data source as previously described. Distance information may be based on the location information and road attribute data (e.g., road curve location with respect to current location). Vehicle speed data may be based on actual vehicle speed or predicted vehicle speed. Actual vehicle speed data may be provided by the speed sensor 72. Predicted vehicle speed data may be based on the rate of change of vehicle speed, which may further be based on road incline or slope data, vehicle weight, and vehicle rolling resistance data. The time to engage and disengage the differential lock may be based on vehicle development testing and may further be based in part on axle assembly input and output torques or input and output rotational speeds, which may be used to assess the time needed to increase the rotation speed at the input of the differential to permit gear teeth to mesh and execute locking of the differential. If there is not sufficient time to reengage and disengage the differential lock, then the method may continue at block 116 where the differential lock may be maintained in the disengaged or unlocked position. If there is sufficient time to reengage and disengage the differential lock, then the method may continue at block 120.

At block 120, the differential lock may be reengaged, or actuated from the disengaged position to the engaged position to attempt to improve vehicle traction. The differential lock may then be actuated from the engaged position back to the disengaged position. Such disengagement may occur before the vehicle reaches or is located at the target point.

Referring to FIG. 3, more details regarding disengagement conditions and establishing associated target points for unlocking the differential, or actuating the differential lock to the disengaged position will now be discussed. As previously mentioned, a disengagement condition may be detected or may exist when the vehicle is traveling up an incline of sufficient magnitude and/or when the vehicle is expected to negotiate a curve having a sufficient magnitude. Both types of disengagement conditions are shown in FIG. 3. It is also contemplated that the method may address a single disengagement condition rather than multiple disengagement conditions.

At block 200, the method may determine whether the vehicle is traveling up an incline of sufficient magnitude. An incline may have a sufficient magnitude when its slope or grade exceeds a threshold incline value. As such, a disengagement condition may exist for sufficiently steep inclines, but not for relatively flat inclines. Road incline data may be provided by the inclinometer 74 or may be based on vehicle location and road attribute data (e.g, road attribute data may include terrain or road grade data and vehicle location data may facilitate selection of such data). The threshold incline value may be established or may be based on vehicle development testing and may help distinguish sufficiently steep inclines for which differential locking may be beneficial from relatively flat inclines. If the vehicle is traveling up an incline that exceeds the threshold incline value, then the method may continue at block 202. If the vehicle is not traveling up an incline that exceeds the threshold incline value, then the method may continue at block 204.

At block 202, the method may set a target point for disengaging the differential lock. For example, the target point may be set at the crest of an incline for when the vehicle is or will be traveling uphill. More specifically, the target point may be set at the crest of an incline when the incline has a slope or grade having a magnitude that exceeds the threshold incline value. As such, a target point may be set for sufficiently steep inclines but may not be set for relatively flat inclines for which additional traction from differential locking may not be desired or of sufficient value. Moreover, the target point may be set such that torque may be provided for as long as possible to aid in propelling the vehicle up the incline.

At block 204, the method may determine whether the vehicle is expected to negotiate a road curve of sufficient magnitude. For example, the method may determine whether a road curve having a sufficiently tight radius of curvature or curvature of a sufficient magnitude is within a threshold distance from the vehicle. Road curvature data may be provided by or may be included with the road attribute data and may be compared to a threshold curvature value. The threshold distance may be based on vehicle development testing and may be used to select road curves for analysis or evaluation that are located sufficiently close to the vehicle or that the vehicle may encounter in the near future. As such, road curves located along different roads or travel routes or that are located far ahead of the vehicle may be filtered and at least temporarily omitted from analysis. The threshold curvature value may be based on vehicle development testing and may be a constant value or variable amount that may be correlated with vehicle speed. For example, a lookup table may be provided that may associate different road curvature values with multiple vehicle speed values. As such, road curves may have a sufficiently tight radius of curvature at higher speeds than lower speeds and tighter curves may have lower speeds at which they are deemed as having sufficient magnitude to warrant differential lock disengagement. If a road curve of sufficient magnitude is within a threshold distance from the vehicle, then the method may continue at block 206. If a road curve of sufficient magnitude is not within a threshold distance from the vehicle, then the method may continue at block 208.

At block 206, the method may determine whether the vehicle speed is greater than a threshold speed value. The vehicle speed may be the actual speed of the vehicle provided by the speed sensor 72 or a predicted speed value that may be based on a rate of acceleration or deceleration of the vehicle. The threshold speed value may be based on vehicle development testing and may be a constant or variable amount. For example, a lookup table may be provided in which a threshold speed value may be associated with different road curvatures or different radius of curvature values. As such, blocks 204 and 206 may filter conditions at which differential locking may or may not affect vehicle handling and/or accelerated tire wear. If the vehicle speed does not exceed the threshold speed value, then the method may continue at block 208. If the vehicle speed exceeds the threshold speed value, then the method may continue at block 210.

At block 208, the differential lock may be maintained in the engaged position similar to block 108. As such, the differential lock may not be disengaged when a road curve of sufficient magnitude is not with in a threshold distance from the vehicle and/or when the actual or predicted vehicle speed is not greater than a threshold speed value. Vehicle handling and/or tire wear may not be significantly affected under such conditions.

At block 210, the differential lock may be disengaged before the target point and/or the current target point may be revised. For example, if the vehicle is traveling up an incline of sufficient magnitude, then the current target point may have been set at the crest of the incline at block 202. Such a target point may not be appropriate when the vehicle will encounter a road curve at a sufficiently high rate of speed before reaching the crest due to the potential effect on vehicle handling performance and/or tire wear. As such, block 210 may disengage the differential lock before the vehicle reaches the crest of the incline and before the vehicle reaches the curve. Alternatively, the target point may be revised or updated to a new point or location such that the differential lock is disengaged before the vehicle reaches the crest of the incline and before the vehicle reaches the curve. In any event, the differential lock may be disengaged while the vehicle is in motion.

The methodologies described above may allow for the control of an axle assembly and differential lock such that the engagement of the differential lock may be permitted at any vehicle speed. As such, the method differs from current industry standards in which differential locking is unilaterally prohibited above a predetermined speed, such as 25 mph (40 km/h). As such, the methodologies described above allow differential lock actuation to provide additional traction at higher vehicle speeds than are currently seen in the industry. Moreover, the method facilitates vehicle control in that the differential may be automatically unlocked when the vehicle approaches a high-speed corner to inhibit understeering through the corner that may be otherwise occur if the differential remained locked.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a differential lock of a driveline of a vehicle, comprising:
   determining with an electronic control module a target point for disengaging the differential lock when the vehicle is travelling up an incline that exceeds a threshold incline value; and
   disengaging the differential lock with the electronic control module when the vehicle reaches the target point.

2. The method of claim 1 wherein determining the target point is based on road attribute data and vehicle location data that is wirelessly transmitted to the vehicle.

3. The method of claim 2 wherein vehicle location data is provided by a global positioning system.

4. The method of claim 2 wherein road attribute data is provided by another vehicle.

5. The method of claim 1 wherein the target point is a crest of the incline.

6. The method of claim 1 wherein the differential lock is disengaged before the target point when a road curve of sufficient magnitude is within a threshold distance from the vehicle.

7. The method of claim 6 wherein the differential lock is disengaged while the vehicle is in motion and before the vehicle reaches the road curve.

8. The method of claim 1 wherein the differential lock is disengaged before the vehicle reaches the target point when a road curve of sufficient magnitude is within a threshold distance from the vehicle and a vehicle speed is greater than a threshold speed value.

9. The method of claim 8 wherein the differential lock is not disengaged when a road curve of sufficient magnitude is not within the threshold distance from the vehicle.

10. The method of claim 8 wherein the differential lock is not disengaged when the vehicle speed is not greater than the threshold speed value.

11. The method of claim 1 wherein vehicle wheels are inhibited from rotating at different speeds when the differential lock is engaged and permitted to rotate at different speeds when the differential lock is disengaged.

12. The method of claim 11 wherein there is no maximum vehicle speed above which engagement of the differential lock is inhibited.

* * * * *